United States Patent [19]

Gibbs et al.

[11] Patent Number: 5,832,218
[45] Date of Patent: Nov. 3, 1998

[54] CLIENT/SERVER ELECTRONIC MAIL SYSTEM FOR PROVIDNG OFF-LINE CLIENT UTILIZATION AND SEAMLESS SERVER RESYNCHRONIZATION

[75] Inventors: Robert Gibbs; Sebnem Jaji, both of Austin, Tex.

[73] Assignee: International Business Machines Corporation, Armonk, N.Y.

[21] Appl. No.: 572,589

[22] Filed: Dec. 14, 1995

[51] Int. Cl.[6] .................................................. H04L 12/00
[52] U.S. Cl. .............................. 395/200.33; 395/200.47; 395/200.57; 379/93.24
[58] Field of Search ............................ 364/514 A, 514 B, 364/514 C, 514 R; 395/200.03, 200.04, 200.19, 200.33, 200.31, 200.47, 200.57; 370/264; 379/88, 89, 96, 93.24

[56] References Cited

PUBLICATIONS

Gralla, "WinCIM brings compuServe to Windows", PC–Computing, Jan 1993.
Bowen, "Programs that Put Punch in Your E–Mail", CompuServe Magazine, Mar. 1990.
Bonner, "Access PC/Contact via Windows", PC–Computing, Aug. 1991.
Daroy et al., "MEmail: A Distributed Multimedia Electronic Mail System", IEEE, Aug. 1994.

*Primary Examiner*—James P. Trammell
*Assistant Examiner*—Patrick J Assouad
*Attorney, Agent, or Firm*—Mark S. Walker; Andrew J. Dillon

[57] ABSTRACT

An electronic mail (E-Mail) server system is disclosed that is used within a client/server network system. Typically, the network system includes at least one client connected to a server. The E-Mail server system comprises a mail server, a client mail server, located within the client, and a log manager. The mail server, which is located within the server of the client/server network system, provides a plurality of E-Mail functions accessible across the client/server network system. The client mail server access the mail server and invokes the mail server to copy selected ones of a plurality of the E-Mail functions in the client mail server to enable the client to perform E-Mail composing while in a disconnected state from the mail server. The log manager logs all E-Mail activity performed by the user on the client while in the disconnected state and then performs reconnection and resynchronization between the client and server for replaying the logged activity for execution by the mail server. Optimally, the client/server network system operates in an object oriented environment so that the local client/server instantiates selected ones of class functions of the plurality of E-Mail functions.

17 Claims, 6 Drawing Sheets

CLIENT/SERVER ELECTRONIC MAIL SYSTEM FOR PROVIDNG OFF-LINE CLIENT UTILIZATION AND SEAMLESS SERVER RESYNCHRONIZATION

BACKGROUND OF THE INVENTION

1. Technical Field

The present invention relates in general to client/server data communication systems and, more particularly, to an electronic mail system for use within a client/server data processing system. More particularly still, the present invention is directed towards an electronic mail system to perform e-mail task while off-line of the server system and to have e-mail transactions performed seamlessly with the server to transmit and receive messages once resynchronization has occurred.

2. Description of the Related Art

Computer systems are well-known in the arts and have become a business staple and are also found in many homes. One feature available to the business world is that of using electronic mailing (e-mail) to send messages and receive messages and other information to and from one another in a business setting. Likewise, home computers or laptops allow telecommuting such that a user can connect to the user's work server and download and upload messages.

The e-mail system allows clients of a network system, which is maintained by a server system, to send messages or data from one user to another. In order to minimize disk space and requirements as well as to maximize functionality and consistency of the electronic mailing engine used with in the network system, the engine is typically located on the server and is merely accessed by a client in order to send messages or retrieve messages to or from another user or client on the server system. As long as the client is connected to the server system, the client has full access to all e-mail capabilities. Thus, the client system typically allows the user to perform such operations as composing, updating, and sending messages while the server in such a system provides a server based message repository, as well as providing message transmission and reception functions for the user at the client level.

In most client/server networks, the clients are in a permanent state of physical connection or access to the server, such that as clients compose, update, and send messages, they are basically flowing these messages into the server, where the permanent state of the messages is kept.

A typical disconnected user may want to take the messaging functions with him either to telecommute from home or on the road with, for example, a notebook computer, and while telecommuting, compose, update, and send messages as if server connected and then, on demand, reconnect to the server and synchronize their disconnected operations with the server.

A first problem facing a user who is disconnected from the server is that the login operation must be performed by the e-mail system in order to resynchronize. Next, the replaying of the e-mail operations into the server when reconnected, such as that when the client and server are resynchronized, typically must be requested by the user after resynchronization, thereby performing sending and receiving of messages once reconnected to the server.

SUMMARY OF THE INVENTION

It is therefore one object of the present invention to provide client/server data communication systems.

It is another object of the present invention to provide an electronic mail system for use within a client/server data processing system.

It is yet another object of the present invention to provide an electronic mail system to perform e-mail task while off-line of the server system and to have resynchronization performed seamlessly with the server to transmit and receive messages once resynchronization has occurred.

Yet another object of the present invention is to provide a client/server distributed computing environment where an object-based logging and replay framework for the case of distributed E-Mail clients in alternating states of communication connection and disconnection to the E-Mail server is provided.

The foregoing objects are achieved as is now described. According to the present invention, an electronic mail (E-Mail) server system is disclosed that is used within a client/server network system. Typically, the network system includes at least one client connected to a server. The E-Mail server system comprises a mail server, a client mail server, located within the client, and a log manager. The mail server, which is located within the server of the client/server network system, provides a plurality of E-Mail functions accessible across the client/server network system. The client mail server accesses the mail server and invokes the mail server to copy selected ones of a plurality of the E-Mail functions in the client mail server to enable the client to perform E-Mail composing while in a disconnected state from the mail server. The log manager logs all E-Mail activity performed by the user on the client while in the disconnected state and then performs reconnection and resynchronization between the client and server for replaying the logged activity for execution by the mail server. Optimally, the client/server network system operates in an object oriented environment so that the local client/server instantiates selected ones of class functions of the plurality of E-Mail functions.

The log manager further comprises optimizing means that allow the log manager to optimize the log events for replay. This optimization typically includes removing redundant sequences within the logged events. Additionally, a local message store is used to store messages generated during use of the plurality of E-Mail functions during the disconnect state for later replay to the mail server. A server message store is likewise provided in the mail server for storing the replay message from the local message store after reconnection and resynchronization.

A method is also disclosed of providing electronic mail services to a user in a disconnect state on a client/server network system. The method, which is intended for use while the user is connected to the client/server network as a client initially sends a user initiated disconnect command to the server within the client/server network. The system then copies selected E-Mail functions from the server to the client for use by the user and then enters a disconnect state between the client and the server. While in the disconnect state, the user is able to perform E-Mail operations with the selected E-Mail functions by the user and log the E-Mail operations automatically. When the user attempts to reconnect to the server, the system send a user initiated reconnect command from the client to the server and then begin copying the logged E-Mail operations from the client to the server and processes these E-Mail operations within the server. During the reconnection, the system attempts to perform resynchronization between the client and the server and the logging step stores E-Mail operations sequences in a log queue while message are stored in a client message store. The sequence storing step further comprises optimizing E-Mail operation sequence in the log queue by removing redundant E-Mail operations from the log queue.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
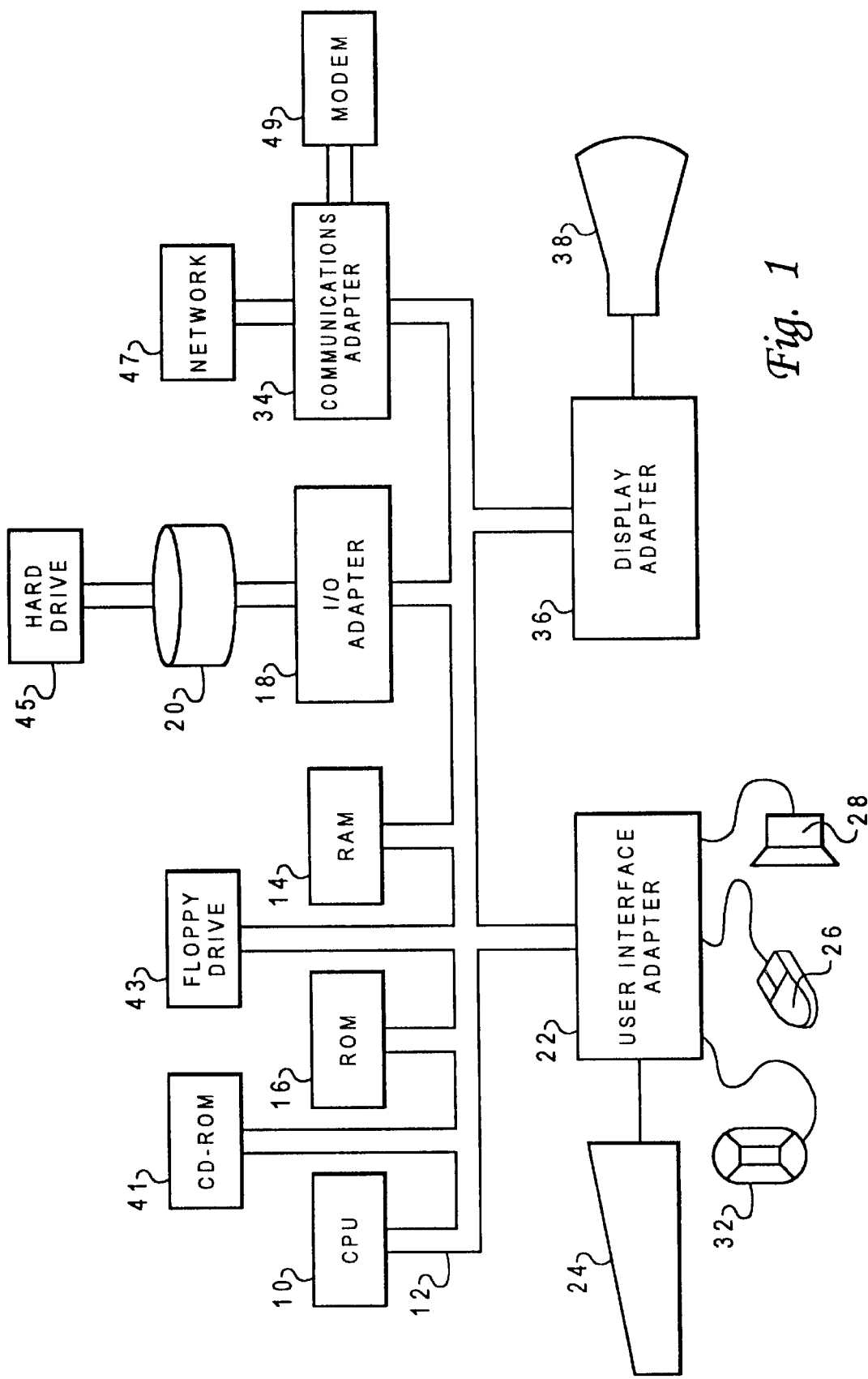
FIG. 1 depicts in accordance with a preferred embodiment of the present invention a representative hardware environment which illustrates a typical hardware configuration of a workstation.

The invention is preferably practiced in the context of the operating system resident on an IBM PS/2 computer available from IBM Corporation. A representative hardware environment is depicted in FIG. 1, which illustrates a typical hardware configuration of a workstation in accordance with subject invention having a central processing unit 10 such as a conventional microprocessor, a number of other units interconnected via a system bus 12. The workstation shown in FIG. 1 includes a Random Access Memory (RAM) 14, Read Only Memory (ROM) 16, and I/O adapter 18 for connecting peripheral devices such as disk units 20 to the bus, a user interface adapter 22 for connecting a keyboard 24, a mouse 26, a speaker 28, a microphone 32, and/or other user interface devices such as a touch screen device (not shown) to the bus, a communication adapter 34 for connecting the workstation to a data processing network and a display adapter 36 for connecting the bus to a display device 38. Other peripheral device may include non-writable storage media (e.g. read only memory devices within a computer such as ROM 39 or CD-ROM disks 41 readable by a computer I/O attachment), writable storage media (e.g. floppy disks 43 and hard drives 45), or communication media such as network 47 and telephone networks via a modem 49. The workstation has resident there on the OS/2 operating system, provided by IBM Corp., and the computer software making up this invention, which is included as a tool kit. Other operating systems include AIX X-windows and Microsoft's Windows95.

Object oriented programming has established itself as an important methodology in developing high quality, readable code. The invention includes a dynamic object oriented log frame object that expands the currently defined notion of a log manager by encapsulating logging information and procedures into a cohesive unit, thereby enabling an application to be internationalized. The log frame object is then extended to allow for different connected states, such as, for example, Connect, Disconnect, and Reconnections. The language used to implement the present invention is primarily in C++ for OS/2 and the concepts of software programming, especially in object oriented programming, are detailed in U.S. Pat. No. 5,361,350, entitled "Object Oriented Method Management System and Software for Managing Class Method Names in a Computer System", commonly assigned to the Assignee of the present invention and herein incorporated by reference for all purposes.

The workstation of FIG. 1 represents a typical client or server according to the present invention. Further, the electronic mail client/server architecture is further illustrated in FIG. 2, where the mail client 60 interacts with the mail server 62, which further includes the message store or repository 64. The mail server 62, along with the message store 64 uses an object-based solution to overcome the problems of providing logging and resynchronization functions for the case of a disconnected e-mail client.

Figure 2:
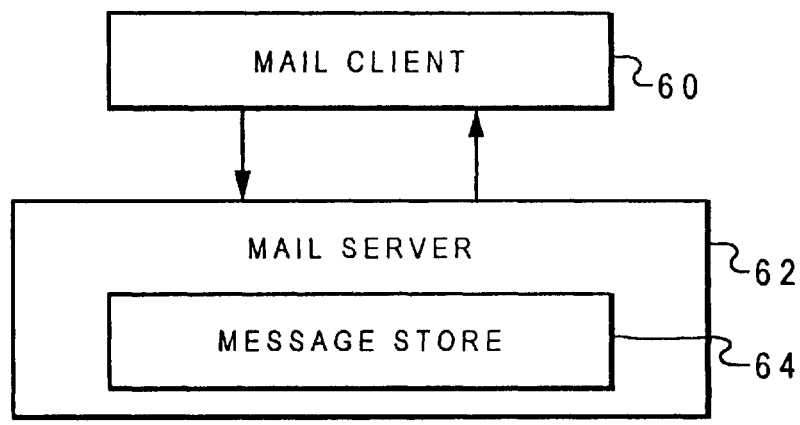
FIG. 2 is the electronic mail client/server architecture where the mail client interacts with the mail server.
Figure 3:
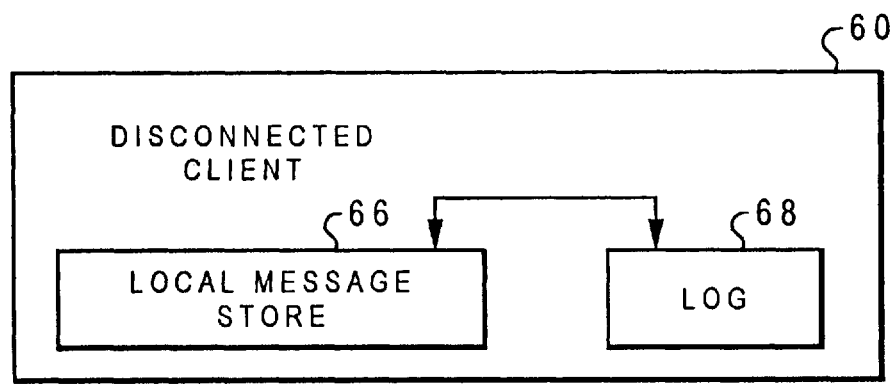
FIG. 3 depicts a disconnected e-mail client.
Figure 3:
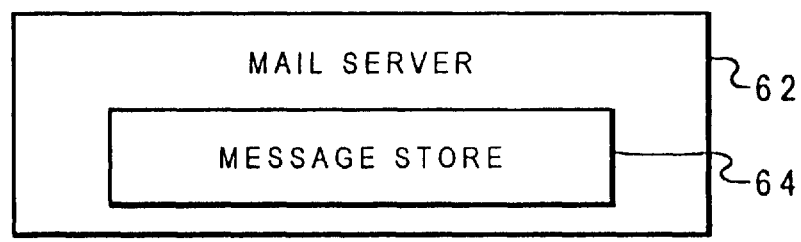

An example of a disconnected e-mail client is illustrated in FIG. 3. The client 60 is no longer in communication with server 62 and, for this situation, operations such as composing and sending messages are shown being delivered into a client message store 66 and "memory" of those operations is being maintained in a log 68. This log 68 is used as the basis for replay into server 62 when client 60 reconnects to server 62 as shown in FIG. 2.

Figure 4:
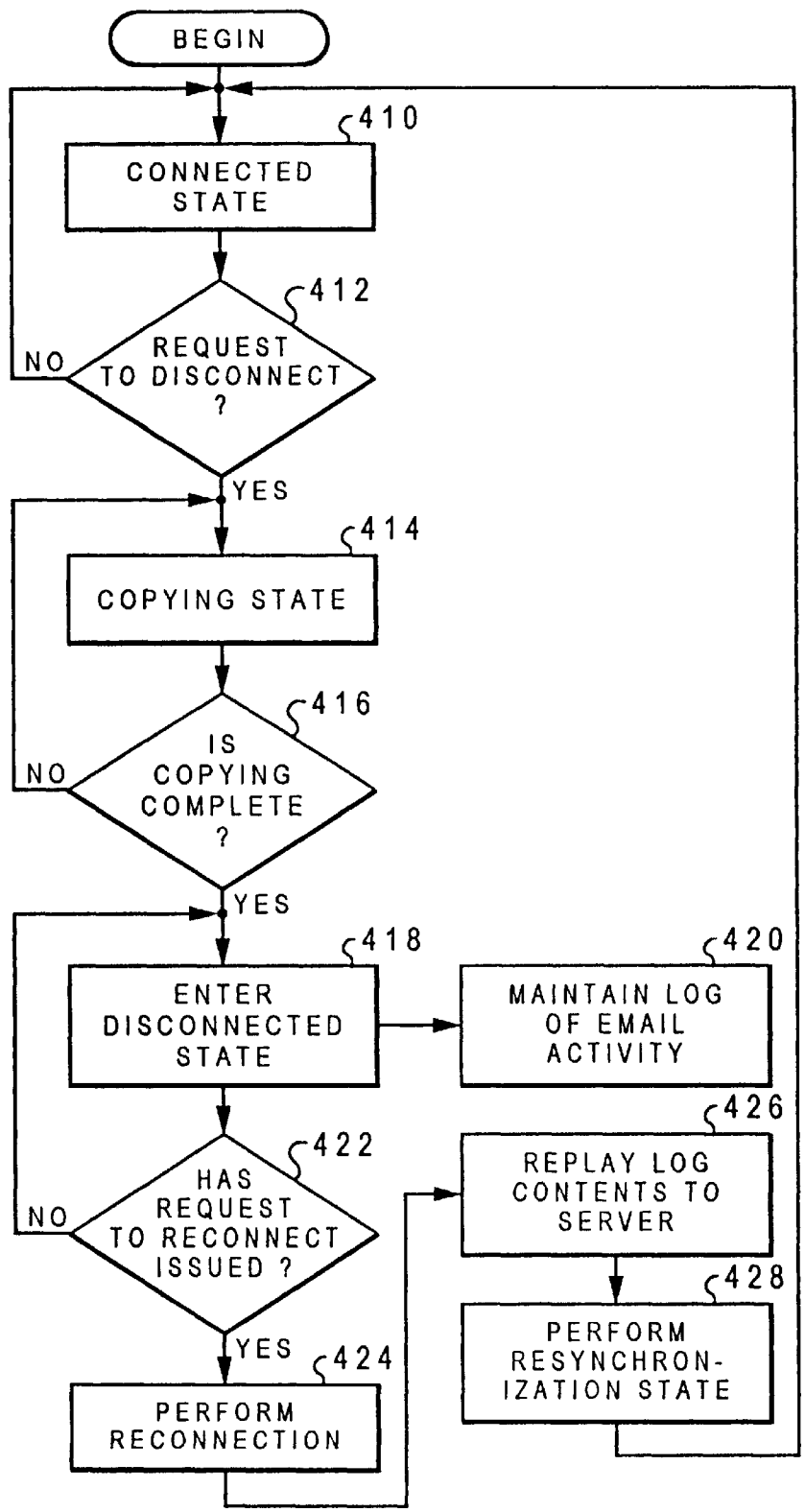
FIG. 4 illustrates four separate client states anticipated by the present invention.

The present invention anticipates four separate client states that are illustrated in the flow diagram in FIG. 4. In block 410, the first state is a connected state where the client and server are connected one to another in synchronous transmission. When the user, via client 60 elects to disconnect from the server 62 (block 412) and maintain functions on the user's system, a signal is sent to server 62 signifying that a disk connect operation is requested. At this time, the next state is entered (block 414) where the server system begins copying selected folders and messages into the local message store 66 within client 60. Filters are used to specify which messages and folders should be copied into the local message store 66 until completed (block 416). The filters include download messages by folder, by message size and by date. At the end of the copying operation, the third state or disconnected state, shown in block 418, is entered. During the disconnected state, operations that will eventually need to be resynchronized with the server are logged in log file 68 as shown in block 420.

While disconnected, the user eventually wishes to reconnect (block 422) and resynchronize with the server system and selects a connect operation (block 424) that begins the resynchronization state of block 426. The resynchronization state is entered (block 428) and the logged operations are replayed from local message store 66 the server in message store 64. When all of log file 68 is replayed into message store 64, local message store 64 is discarded and the connected state is re-entered block 410.

Figure 5:
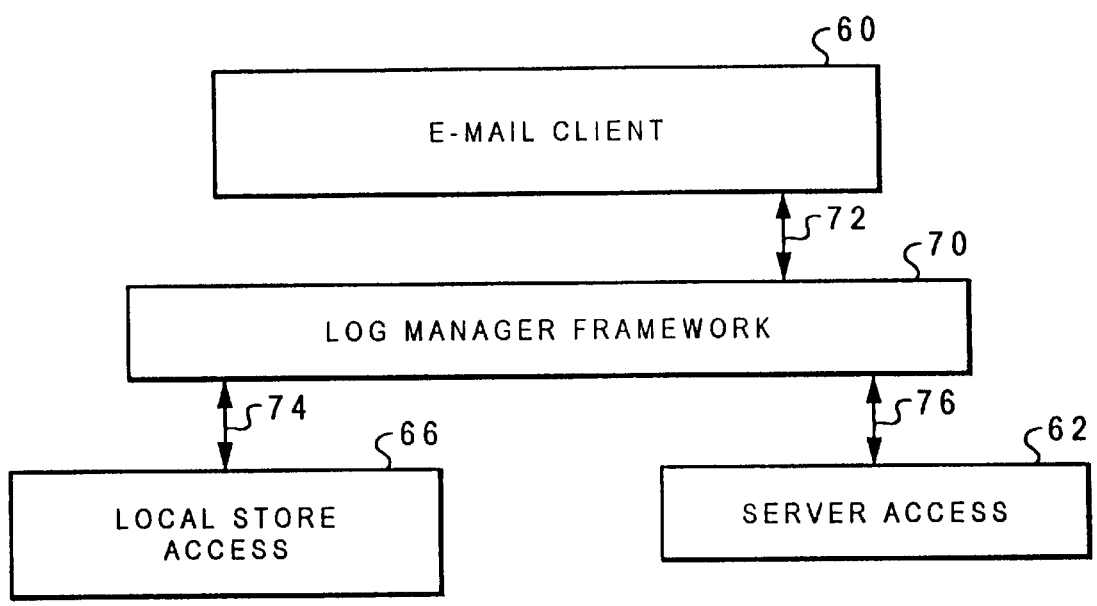
FIG. 5 depicts is a block diagram illustrating the architecture of the synchronization system according to the present invention.

FIG. 5 is a block diagram illustrating the architecture of the synchronization system according to the present invention. As earlier shown, block 60 is the e-mail client while log manager framework 70 provides management of the log 68 shown in FIG. 3. Log manager 70 uses e-mail interface 72 to allow the client to perform e-mail functions. These function include recording changes to messages stored in local message store 66 when in the disconnected state that are necessary for subsequent replay to the connected server 62. Further, these mail functions allow the client to request a replay sequence of the log into a connected server.

Retrieve interface 74 is used by log manager 70 to retrieve data that must be propagated to the server for resynchronization. A replay interface 76 is used by log manager 70 to replay the logged operations into server 62.

Figure 6:
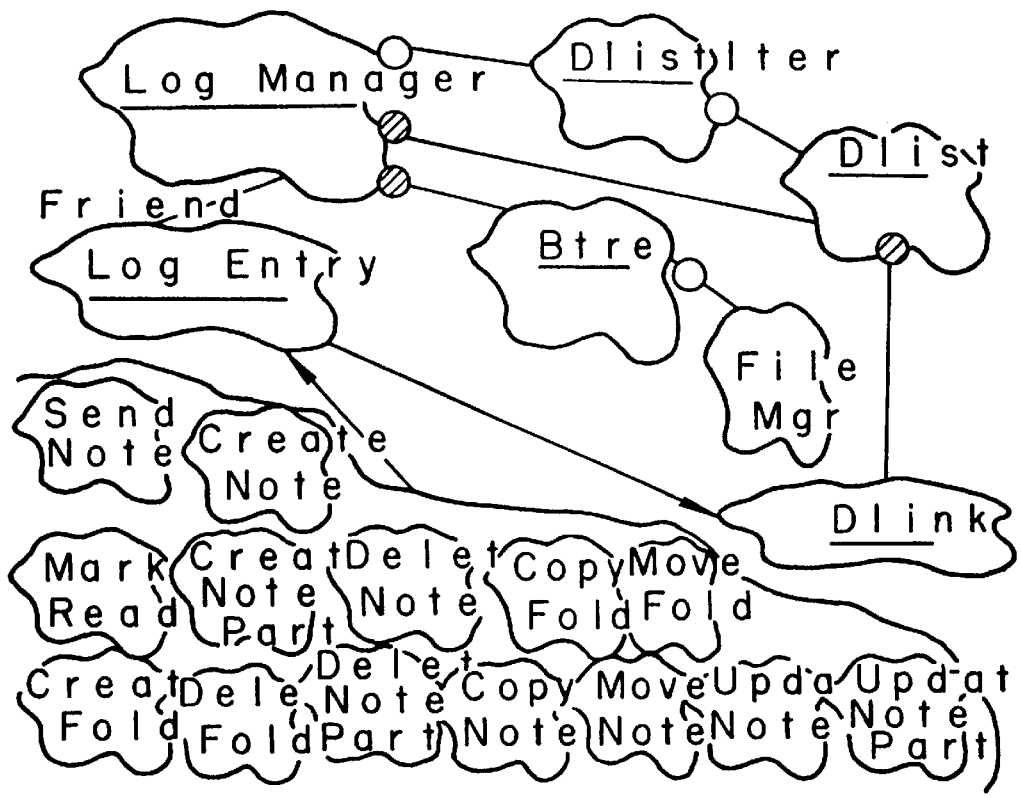
FIG. 6 is a log manager implementing a client modification log as previously described.
Figure 7:
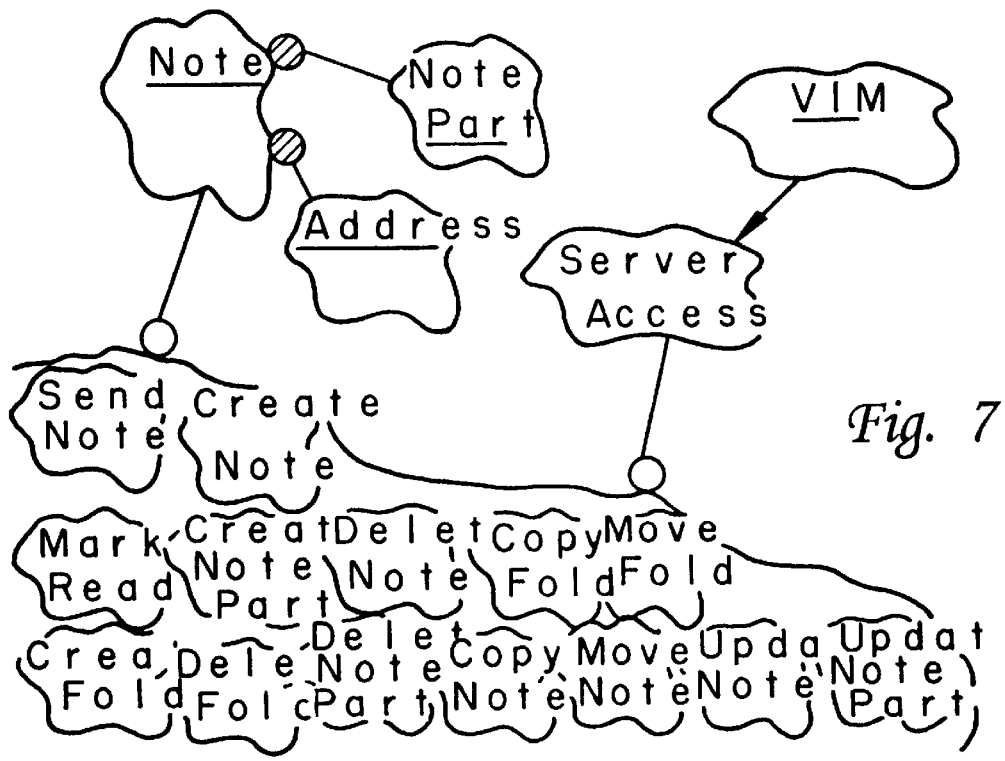
FIG. 7 is a log-manager framework class relationship for replaying the log operations into the server upon reconnection.

The log manager framework 70, used in FIG. 5, consists of object classes shown in the class diagrams of FIGS. 6 and 7. The notation is conventional object model notation well understood by those skilled in the art. Where the class name is found within one of the clouds while an arrow pointing from one class to the other is where the destination class inherits from the source class. Where a line with a dark circle attaching to classes refers to where the destination class contains an instance of the source class. Where the circle is light, the destination class uses or references instances of the source class.

Figure 8:
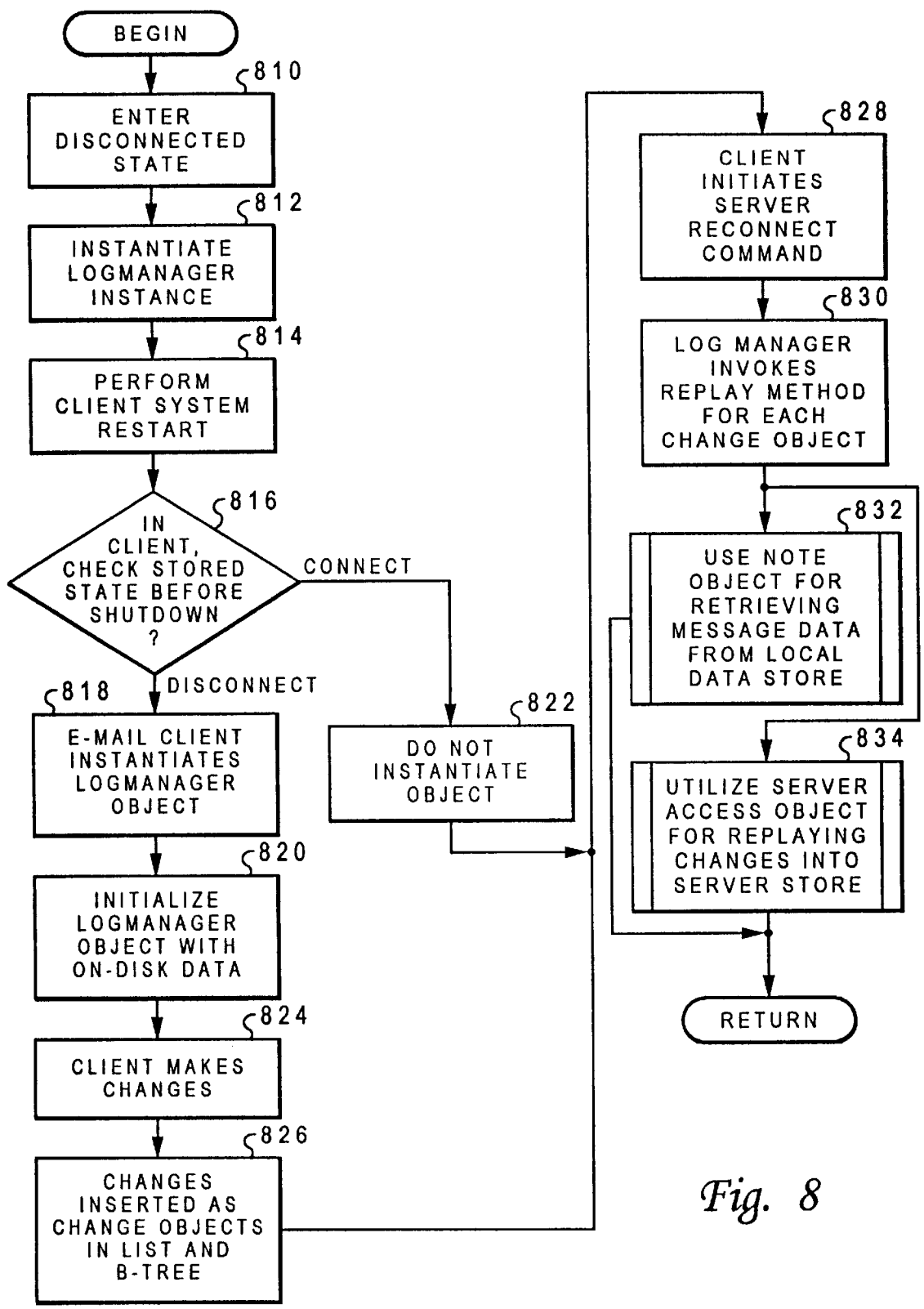
FIG. 8 depicts a flowchart of log manager implementing a client modification log as previously described.

In FIG. 6, and as depicted in the flowchart of FIG. 8, log manager 70 implements a client modification log as previously described. When a user logs into a disconnected client, a log manager object instance is instantiated on the client. Upon entering the disconnected state (block 810), a logmanager instance is instantiated (block 812). After a shutdown of the client system, when the client system is re-started (block 814), the e-mail client checks its stored state before the shutdown (block 816). If this state is the disconnected state, the e-mail client instantiates a logmanager object (block 818) and initializes it with the on-disk persistent logmanager data (block 820). If the state previous to the shutdown was the connected state, then the logmanager object is not instantiated (block 822). This list serves as the "memory" of the changes made to the message store while the client is disconnected from the server. The disconnected log is maintained as both an "in memory" list and is also made persistent and optimized on the disconnected clients disk, in the form of a b-tree. As the disconnected client continues to make changes (block 824), these changes are inserted as change objects into the list as well as being inserted into the disk-based b-tree (block 826).

At the point where the client chooses to reconnect to the server (block 828), log manager 70 processes the list of change objects, invoking the replay method for each change object (block 830).

Each change object's replay method uses the services of:
the note object for retrieving message data from the local message store, associated with the particular change object's operation (block 832);
the service access object for replaying the changes into the permanent server (block 834).

The log manager framework classwork relationships illustrated in FIG. 6 are now described. The log manager object 80 is the basis for the client's implementation of a modification log. The client instantiates an instance of this class when logging into a disconnected client. The log manager constructor takes a logname argument and restores the object from the persistent store. The public methods of this class are provided to the client for recording changes and requesting replay service. They are provided by e-mail interface 72 shown in FIG. 5.

The log manager class has the following public methods, NumberOfEntries(), which returns the number of change objects in the log, and Replay(), which is provided to the client in order to request a replay to the server. In e-mail interface 72, the client provides a user identification and password, as well as providing callback functions for stop replay and replay progress.

Internally, this causes the following processing within log manager 70. The service access object is instantiated and the ServiceAccess_Start() and ServiceAccess$_{13}$ Open_Session methods are invoked. Log manager 70 then proceeds to iterate through the list of change objects, invoking the replay methods on each. For each change object processed:
the replay progress callback function is invoked to update the remaining number of logged entries;
the stop replay callback function is invoked to determine whether or not the client has chosen the cancel the replay request and disconnect from the server.

The invention provides for a new group of change methods utilized for logging. These methods are provided to the client in the order record changes are made in the disconnected state. Each of the change methods creates one of the change objects from the log entry class, and then inserts the change object into the list represented by the Dlist class shown in Table I.

TABLE I

| | |
|---|---|
| SendNote() | DeleteNotePart() |
| CreateFolder() | UpdateNotePart() |
| DeleteFolder() | MarkRead() |
| CreateNote() | MoveNote() |
| DeleteNote() | CopyNote() |
| UpdateNote() | CopyFolder() |
| CreateNotePart() | MoveFolder() |

The log manager further includes a group or class of optimization methods used to implement log optimization by removing redundant change objects or operation sequences from the log, thereby reducing the subsequent replay time during resynchronization. For example, a create method followed by a sequence of update operations, followed by a delete is redundant and the entire sequence of change objects is removed from the log. Moreover, if an update request (method) is received for an object, and there is a previous change entry for that object in the log, the previous change entry is removed and a new update entry is appended to the list. Also, a delete request will result in removal of a create entry, if the object to be deleted was created during the disconnected state of the client.

The log manager also requires a group of instance variables which include the following. The first variable is session, which identifies the replay (methods) used to identify themselves to the server during replay operations. The next variable is the log entries list, which is a linked persistent list of change entries appended to the list in chronological order. An in-memory copy of the list is kept synchronized with a disk copy. The log_entry_Ids are unique and are generated in a non-reoccurring monotonically increasing order. The remaining variables include number_of_entries, number_of_entries_canceled, number_of_entries_replayed, number_of_entries_committed, and last_log_entry_Id.

The next class is the log entry class, which establishes virtual methods for inheritance by each of the change objects. The virtual methods are designed to be inherited by the change objects and include the get_data_from_local_store, replay(), and commit() methods. The get_data_from_local_store is a method that retrieves the data associated with the change object to which they belong, using the services of the note object. The replay methods provide the required replay sequences associated with the change object to which they belong. The commit() methods examine the return codes from the associated replay() methods for appropriate error recovery as well as marking objects as committed on successful replay into the server.

The log manager further provides a group of change objects that have the class function of inheriting from the log entry class. Further, the change objects operate such that each one overrides the log entry objects get_data method, replay method, and commit method. A change object is instantiated and inserted into a memory-linked list in either of two scenarios. The first scenario is that at entry into disconnected state, where a previous disk-backed version of the log existed. In this case, for each representation of a change object on the disk, the change object is instantiated and added to the list. The second situation is where the client has invoked a change method against the log manager object. In this case, the corresponding change object is instantiated, added to the memory-based linked list and also the disk-backed log. If new change objects are needed, these may be subclassed from the log entry class, such that the new change object can automatically be included in the generic log process scheme. The following is a list of the instance variables for each change object:

| SendNote | DeleteNotePart |
|---|---|
| ParentFolderId | ParentFolderId |
| NoteId | NoteId |
|  | NotePartId |
| CreateFolder |  |
| ParentFolderId | UpdateNotePart |
| NewFolderName | ParentFolderId |
|  | NoteId |
| DeleteFolder | NotePartId |
| ParentFolderId | Original Time Stamp |
| FolderName |  |
|  | MarkRead |
| CreateNote | ParentFolderId |
| ParentFolderId | NoteId |
| NewNoteId |  |
|  | MoveNote |
| DeleteNote | SourceParentFolderId |
| ParentFolderId | SourceNoteId |
| NoteId | DestinationParentFolderId |
| UpdateNote | CopyNote |
| ParentFolderId | SourceParentFolderId |
| NoteId | DestinationParentFolderId |
| Original Time Stamp | SourceNoteId |
|  | NewNoteId |
| CreateNotePart |  |
| ParentFolderId | CopyFolder |
| NoteId | SourceParentFolderId |
| NewNotePartId | DestinationParentFolderId |
|  | SourceFolderName |
|  | DestinationFolderName |
| MoveFolder |  |
| SourceParentFolderId |  |
| DestinationParentFolderId |  |
| SourceFolderId |  |
| NewFolderName |  |

The Dlisted class is a doubly linked list class used to instantiate and maintain the list of change objects. The DlistIter is a class function that provides iteration over the Dlist by providing operators for iterating the list. Just as the log manager contains a Dlist instance, the log manager also uses the services of the DlistIter to traverse the list. The Dlink class provides a basic list element function. The change objects inherit their common list element structure from this Dlink class.

Now with reference to FIG. 7, there is a log-manager framework 70 class relationship for replaying the log operations into the server upon reconnection. In this relationship, there is a server access class, which is a base server access class. All of the functions of the server access class are declared to be virtual. Virtual means this class defines an interface and the implementation of this interface is left to the classes that inherit from this class. In the object oriented frameworks terminology, this type of classes are called service provider interfaces. The server classes inherit from this class, and override the virtual functions. The key here being that when the change objects utilize server access as a part of their replay function, they dispatch server access functions on a pointer to the instantiated server access object. In the example given in FIG. 7, a vendor independent messaging (VIM) interface subclass of the server access class is illustrated. The server access class corresponds to interface 74 in FIG. 5. The virtual methods associated with server access class designed to be inherited and overridden by different subclasses of service access are as follows:

| | |
|---|---|
| ServerAccess_start() | ServerAccess_update_note() |
| ServerAccess_open_session() | ServerAccess_delete_note() |
| ServerAccess_stop() | ServerAccess_delete_notepart() |
| ServerAccess_close_session() | ServerAccess_create_folder() |
| ServerAccess_create_note() | ServerAccess_delete_folder() |
| ServerAccess_move_note() | ServerAccess_copy_folder() |
| ServerAccess_mark_read() | ServerAccess_move_folder() |
| ServerAccess_create_note_part() | ServerAccess_update_note_part(1) |
| ServerAccess_send_note() | ServerAccess_copy_note() |

VIM is an e-mail client application programming interface (API) where the e-mail client is enabled to talk to the server via VIM. VIM API is a well known standard in the art. An example of its implementation is found in cc: Mail, which is offered by Lotus Corp. The server class for the VIM application programming interface (API) is a subclass of the serveraccess class. The VIM class methods override the virtual methods of the serveraccess class. This VIM subclass is a specific example in this application of utilizing a specific ServerAccess type. The VIM subclass is a well-known set of messaging interface specifications that one of ordinary skill in the art would be able to implement. Although the example given in the disclosure or the application is that of the VIM subclass, other types of messaging interfaces could also be substituted as necessary.

The selected methods within the VIM, which override the virtual methods, demonstrate the technique of generic service access. A given change object, such as create_note, would implement its replay method in part by invoking the ServerAccess_create_note function referenced against a pointer to the actual ServerAccess object. The following sequences show how selected ServerAccess methods are actually implemented for the VIM class, by mapping onto sequences of VIM function calls.

ServerAccess_start()
    VIMInitialize()

ServerAccess_open_session()
    VIMOpenSession()

ServerAccess_stop()
    VIMTerminate()

-continued

```
ServerAccess_close_session()
    VIMCloseSession()

ServerAccess_create_note(1)
    VIMCreateMessage()
    VIMSetMessageHeader()
    VIMSetMessageRecipient()
    VIMSetMessageItem() - one or more for adding noteparts
    VIMSetMessagecategory() - placing note in folder it was created in
    VIMCloseMessage(1)

ServerAccess_move_note()
    VIMSetMessageCategory()

ServerAccess_mark_read()
    VIMMarkMessageAsRead()

ServerAccess_create_note_part(1)
    VIMOpenMessageContainer()
    VIMEnumerateMessages() - get a handle to the note
    VIMSetMessageItem()

ServerAccess_send_note()
    VIMOpenMessageContainer() - get container name from folder
    VIMEnumerateMessages()
    VIMSendMessage()

ServerAccess_update_note()
-delete note from server
    VIMOpenMessageContainer()
    VIMEnumerateMessages() - returns a vimref
    VIMRemoveMessage(msgContainer, vimref)
    VIMCloseMessageContainer()

-create note with new (update data)
    VIMCreateMessage()
    VIMSetMessageHeader()
    VIMSetMessageRecipient()

-Add the note parts back to the message
    VIMSetMessageItems()
    VIMCloseMessage()

ServerAccess_delete_note()
    VIMOpenMessageContainer()
    VIMEnumerateMessages() - returns a vimref
    VIMRemoveMessage(msgContainer, vimref)
    VIMCloseMessageContainer()

ServerAccess_delete_notepart()
-delete the message
    VIMOpenMessageContainer()
    VIMEnumerateMessages() - returns a vimref
    VIMRemoveMessage(msgContainer, vimref)
    VIMCloseMessageContainer()

-create message again without note part to be deleted
    VIMCreateMessage()
    VIMSetMessageHeader()
    VIMSetMessageRecipient()
    VIMSetMessageItem() - one or more to add note parts
    VIMSetMessageCategory() - place note in creation folder
    VIMCloseMessage()
```

The Note class, as shown in FIG. 7, uses or references instances of the Log Manager classes and contains instances of the NotePart class and the Address class. The Note class serves as the local message store access provider interface. This corresponds to interface 72 in FIG. 5. Instances of this class are instantiated and used by the replay methods of the change objects. In general, the framework uses the public methods of this object in order to acquire note related data from the local message store necessary for replay into the server. By instantiating and interfacing through only the Note object, the framework decouples itself from the specific architecture of the given client's local message store. The Note object contains other objects which include: address objects representing note recipients and NotePart objects representing note content type and data, such as plain text, rich text, binary, among others. The methods of the note object instantiated by the note object include the following:

NoteId()
To()—Returns a list of Address objects for To recipients
Cc()—Returns a list of Address objects for Cc recipients
Bcc()—Returns a list of Address objects for Bcc recipients
From()—returns an Address object for note originator
Sender()—Returns an Address object for actual sender of note
ReplyTo()—Returns an Address object for which reply is to be sent
Sensitivity()
Importance()
TimeSent()
TimeReceived()
Parts()—Returns a list of NotePart Objects What has been thus described is a client server E-Mail engine that allows a client to disconnect from the server while maintaining E-Mail processing capabilities short of actually sending and receiving messages due to the disconnection. What is provided is an e-mail system for use in a client/server network system that allows the user to reconnect the client in a resynchronization mode or state that seamlessly and transparently sends and receives messages as directed by the client as if the user was in an E-Mail connected state. This system does not require that the logging and replay be tightly coupled to a specific client in terms of required knowledge of local message store, server message store, and external structures, but rather provides a generic solution that uses separable object-base framework. Since the solution is generic, it can be used with any client without tightly coupling the E-Mail to the specific architecture of the client's local message store, or the specific architecture of the client's protocol to its server. Further, the invention provides a generic change log and provides optimization in that, for example, multiple creates and updates and then deletes do not result in inefficiencies during replay. Further, since the basis for replay is a server access object, whose methods are generic, as additional server access types are needed, these object classes can be subclassed from the generic server access class. This minimizes maintenance by limiting change to the new server access type and promotes rapid deployment as new E-Mail APIs must be supported.

Further, the invention provides for a method for operating a client to server E-Mail system consisting of multiple clients in alternate conditions of communication connection and disconnection to a male server, for which in conditions of disconnected communication to the server, the clients continue creating, updating, and sending notes as if connected. This causes a condition on the reconnection to server where the client is no longer in synchronization with the server as far as the states of the messages between clients and server, for which a generic object based solution has been presented to resolve this condition by providing an optimized log of changes made while disconnected and a subsequent replay method on reconnection to resolve the above out of synchronization condition.

As indicated above, aspects of this invention pertain to specific "method functions" implementable on computer systems. In an alternate embodiment, the invention may be implemented as a computer program product for use with a computer system. Those skilled in the art should readily appreciate that programs defining the functions of the present invention can be delivered to a computer in many forms including, but not limited to: (a) information permanently stored on non-writable storage media (e.g. read only memory devices within a computer such as ROM 39 or CD-ROM disks 41 readable by a computer I/O attachment); (b) information alterably stored on writable storage media (e.g. floppy disks 43 and hard drives 45; or (c) information conveyed to a computer through communication media such as network 47 and telephone networks via a modem 49. It should be understood, therefore, that such media, when carrying computer readable instructions that direct the method functions of the present invention represent alternate embodiments of the present invention.

While the invention has been particularly shown and described with reference to a preferred embodiment, it will be understood by those skilled in the art that various changes in form and detail may be made therein without departing from the spirit and scope of the invention.

We claim:

1. An electronic mail (e-mail) server system for use in a client/server network system having at least one client connected to a server, comprising:

a mail server, located in said server, that provides a plurality of e-mailing functions accessible across said client/server network system operating in an object-oriented environment and;

a client mail server, located in said client, that accesses said mail server and invokes said mail server to instantiate selected ones of said plurality of e-mail functions in said client mail server to enable said client to perform e-mail composing while in a disconnected state from said mail server; and a log manager, coupled to said client mail server, that logs all e-mail activity performed by a user on said client while in said disconnect state and performs reconnection and resynchronization between said client and server for replaying said logged activity for execution by said mail server.

2. The invention of claim 1 wherein said log manager further includes:

optimization means for optimizing said logged events for replay.

3. The invention of claim 2 wherein said optimization means removes redundant sequences within said logged events.

4. The invention of claim 1 wherein said mail server is based on a vendor-independent messaging (VIM) interface.

5. The invention of claim 1 wherein said client mail server further comprises:

a local message store that stores messages generated during use of said plurality of e-mail functions during said disconnect state for later replay to said mail server.

6. The invention of claim 5 wherein said mail server further comprises:

a server message store for storing said replayed messages from said local message store after reconnection and resynchronization.

7. The invention of claim 1 wherein said e-mail server system operates independently of the protocol utilized by said client/server network system between said client and said server, thereby providing a generic mail server object for use by said client mail server.

8. A method of providing electronic mail services to a user in a disconnect state on a client/server network system, comprising:

while said user is connected to said client/server network as a client, sending a user-initiated disconnect command to a server within said client/server network system;

copying selected e-mail functions from said server to said client for use by said user;

entering a disconnect state between said client and said server;

performing e-mail operations with said selected e-mail functions by said user;

logging said e-mail operations by storing e-mail operation sequences in a log queue and storing messages in a client message store;

optimizing said e-mail operation sequences in said log queue;

sending a user-initiated reconnect command from said client to said server;

copying said logged e-mail operations from said client to said server; and processing said copied e-mail operations within said server.

9. The method of claim 8 wherein said reconnecting step further comprises:

performing resynchronization between said client and said server.

10. The method of claim 8 wherein said optimizing step further comprises:

removing redundant e-mail operation sequences from said log queue.

11. The method of claim 8 wherein said copying said logged e-mail operations step comprises:

storing said e-mail operations within a message store within said server.

12. The method of claim 8 wherein said copying selected e-mail functions comprises:

instantiating e-mail objects in said server within said client as classes.

13. A computer program product for providing electronic mail services to a user in a disconnect state on a client/server network system, said product comprising:

while said user is connected to said client/server network as a client, instruction means for causing a computer to send a user-initiated disconnect command to a server within said client/server network system;

instruction means for causing a computer to copy selected e-mail functions from said server to said client for use by said user;

instruction means for causing a computer to enter a disconnect state between said client and said server;

instruction means for causing a computer to perform e-mail operations with said selected e-mail functions by said user;

instruction means for causing a computer to log said e-mail operations by storing e-mail operation sequences in a log queue and storing messages in a client message store;

instruction means for causing a computer to optimize said e-mail operation sequences in said log queue;

instruction means for causing a computer to send a user-initiated reconnect command from said client to said server;

instruction means for causing a computer to copy said logged e-mail operations from said client to said server; and instruction means for causing a computer to process said copied e-mail operations within said server.

14. The product of claim 13 wherein said reconnecting instruction means further comprises:

instruction means for causing a computer to perform resynchronization between said client and said server.

15. The product of claim 13 wherein said optimizing instruction means further comprises:

instruction means for causing a computer to remove redundant e-mail operation sequences from said log queue.

16. The product of claim 13 wherein said copying said logged e-mail operations instruction means comprises:

instruction means for causing a computer to store said e-mail operations within a message store within said server.

17. The product of claim 13 wherein said copying selected e-mail functions instruction means comprises:

instruction means for causing a computer to instantiate e-mail objects in said server within said client as classes.

* * * * *

UNITED STATES PATENT AND TRADEMARK OFFICE
CERTIFICATE OF CORRECTION

PATENT NO. : 5,832,218
DATED : Nov. 3, 1998
INVENTOR(S) : *Gibbs et al.*

It is certified that error appears in the above-identified patent and that said Letters Patent is hereby corrected as shown below:

In col. 6, line 5, please delete "ServiceAccess$_{13}$Open" and insert --ServiceAccess_Open--.

Signed and Sealed this

Fifteenth Day of June, 1999

Attest:

Q. TODD DICKINSON

*Attesting Officer*     Acting Commissioner of Patents and Trademarks